United States Patent
Osaki et al.

(10) Patent No.: US 11,879,054 B2
(45) Date of Patent: Jan. 23, 2024

(54) SPHERICAL MAGNESIUM OXIDE, MANUFACTURING METHOD THEREOF, THERMAL CONDUCTIVE FILLER AND RESIN COMPOSITION

(71) Applicant: TATEHO CHEMICAL INDUSTRIES CO., LTD., Ako (JP)

(72) Inventors: Yoshihisa Osaki, Ako (JP); Tomoaki Chikazawa, Ako (JP); Keisuke Tsutsumi, Ako (JP)

(73) Assignee: TATEHO CHEMICAL INDUSTRIES CO., LTD, Hyogo (JP)

( * ) Notice: Subject to any disclaimer, the term of this patent is extended or adjusted under 35 U.S.C. 154(b) by 521 days.

(21) Appl. No.: 17/268,071

(22) PCT Filed: Mar. 27, 2020

(86) PCT No.: PCT/JP2020/013880
§ 371 (c)(1),
(2) Date: Feb. 11, 2021

(87) PCT Pub. No.: WO2020/203711
PCT Pub. Date: Oct. 8, 2020

(65) Prior Publication Data
US 2021/0309833 A1  Oct. 7, 2021

(30) Foreign Application Priority Data
Mar. 29, 2019 (JP) ................................. 2019-066926

(51) Int. Cl.
*C08K 7/18* (2006.01)
*C01F 5/08* (2006.01)
*C08K 3/22* (2006.01)

(52) U.S. Cl.
CPC .................. *C08K 7/18* (2013.01); *C01F 5/08* (2013.01); *C08K 3/22* (2013.01); *C01P 2004/03* (2013.01);
(Continued)

(58) Field of Classification Search
CPC ................ C08K 3/22; C08K 7/18; C01F 5/08
See application file for complete search history.

(56) References Cited

U.S. PATENT DOCUMENTS

2011/0014469 A1   1/2011   Nakagawa et al.
2019/0359873 A1*  11/2019  Konishi .................... C08K 7/18
2022/0219999 A1*  7/2022   Osaki ........................ C01F 5/08

FOREIGN PATENT DOCUMENTS

JP    61-36119 A    2/1986
JP    1-115816 A    5/1989
(Continued)

OTHER PUBLICATIONS

English machine translation of JP 2016-088838A. (Year: 2016).*

*Primary Examiner* — John E Uselding
(74) *Attorney, Agent, or Firm* — Lewis Roca Rothgerber Christie LLP

(57) ABSTRACT

The objective of the present invention is to provide: a spherical magnesium oxide which has high sphericity and excellent moisture resistance, and has excellent fluidity by which a resin composition exhibits excellent fluidity when filled in a resin; and a method for producing the same. The present invention is a spherical magnesium oxide characterized in that: 10-2000 ppm of boron is contained; the total content of silicon and phosphorus is 300-4000 ppm; and the sphericity that can be read from the SEM photograph is 1.00-1.10, when the volume-based cumulative 50% particle
(Continued)

diameter (D50) measured by means of a laser diffraction scattering particle size distribution measurement, is in the range of 3-200 μm.

13 Claims, 1 Drawing Sheet

(52) U.S. Cl.
CPC ...... *C01P 2004/32* (2013.01); *C01P 2004/51* (2013.01); *C01P 2004/61* (2013.01); *C01P 2006/12* (2013.01); *C01P 2006/32* (2013.01); *C01P 2006/90* (2013.01); *C08K 2003/222* (2013.01)

(56) References Cited

FOREIGN PATENT DOCUMENTS

| | | | | |
|---|---|---|---|---|
| JP | 2007-91525 A | 4/2007 | | |
| JP | 2011-20870 A | 2/2011 | | |
| JP | 2016-88838 A | 5/2016 | | |
| JP | 2018-131378 A | 8/2018 | | |
| WO | WO-2012127889 A1 * | 9/2012 | ................ | C01F 5/08 |
| WO | WO-2014188959 A1 * | 11/2014 | ................ | C01F 5/02 |

\* cited by examiner

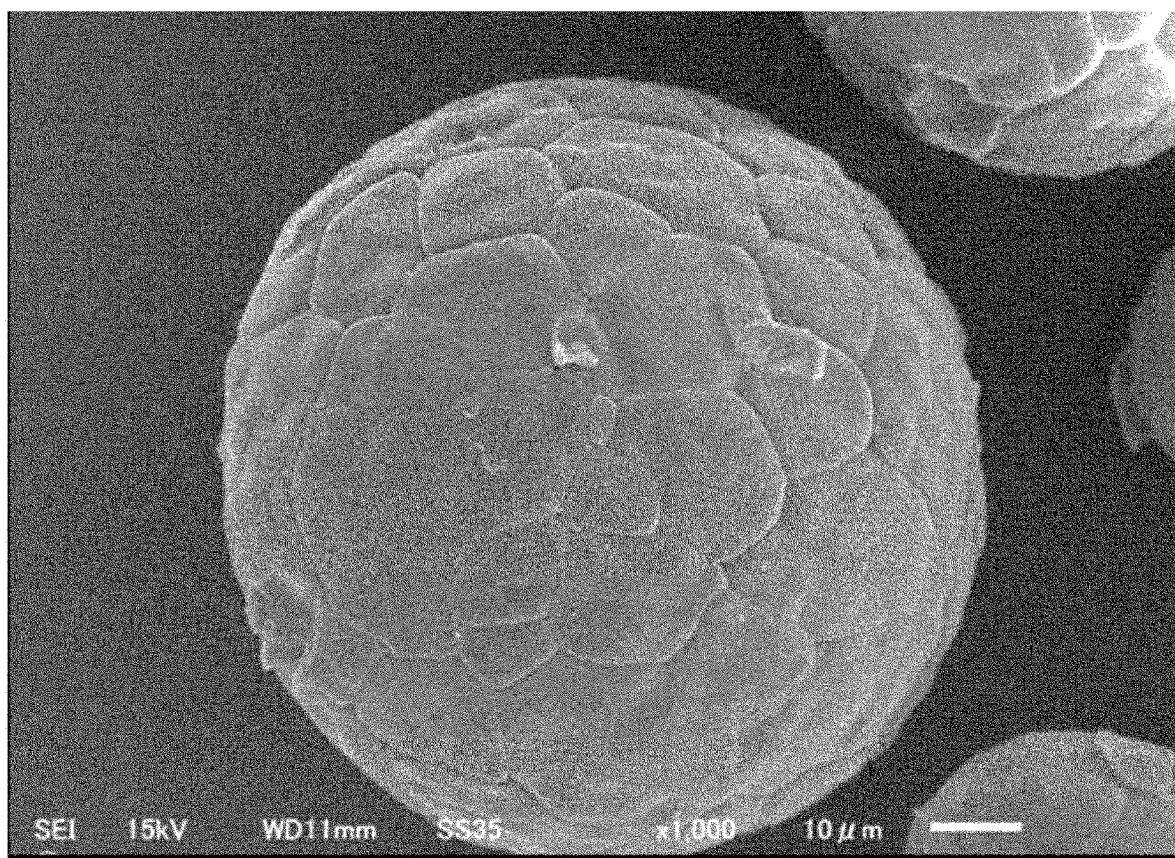

SPHERICAL MAGNESIUM OXIDE, MANUFACTURING METHOD THEREOF, THERMAL CONDUCTIVE FILLER AND RESIN COMPOSITION

CROSS-REFERENCE TO RELATED APPLICATION(S)

This application is a U.S. National Phase Patent Application of, and claims priority to International Application Number PCT/JP2020/013880, filed on Mar. 27, 2020, which claims priority to Japanese Patent Application Number 2019-066926, filed on Mar. 29, 2019, the entire content of each of which is incorporated herein by reference.

TECHNICAL FIELD

The present invention relates to a spherical magnesium oxide which has high sphericity and excellent moisture resistance, and gives excellent flowability to a resin composition when filled in a resin, a method for producing the same, a thermally conductive filler comprising the spherical magnesium oxide, and a resin composition comprising the same.

BACKGROUND ART

With recent high integration, high power and high speed of electronic devices, performance required for insulating heat dissipation fillers has been further improved. Silica, alumina and aluminum nitride have been widely used for thermally conductive fillers. However, despite the low cost, silica has low thermal conductivity and insufficient heat dissipation to cope with the recent increase in the heating value, and there is a problem of stable operation and the like when silica is used in semiconductors. Meanwhile, alumina, which has higher thermal conductivity than silica, has better heat dissipation, but has the problem of high hardness that causes abrasion in production equipment. Furthermore, although nitride fillers such as aluminum nitride have excellent thermal conductivity, such fillers are expensive and can only be used in limited applications. Then, magnesium oxide has been investigated as a highly insulating thermally conductive filler which has a thermal conductivity an order of magnitude greater than that of silica and about twice greater than that of alumina, and has lower hardness than alumina and thus can suppress abrasion in production equipment. However, magnesium oxide is more hygroscopic than silica and alumina, and thus when hydrated with water in the atmosphere, it causes the problems of occurrence of cracks due to volume expansion of the filler, reduction of thermal conductivity and the like. Therefore, magnesium oxide having excellent moisture resistance even for a long time use is needed. Furthermore, when magnesium oxide is used as a thermally conductive filler, high filling properties in a resin composition are required in order to obtain higher heat dissipation.

When magnesium oxide is also used as a thermally conductive filler, high filling properties are required for obtaining higher heat dissipation, and to this end, magnesium oxide whose state of coagulation and particle size distribution have been controlled by adding a boron compound and the like thereto has been proposed (Patent Document 1). However, the magnesium oxide in the document does not have high sphericity, and thus filling properties, smoothness on the surface of particles and moisture resistance are insufficient. Thus, to improve sphericity, a spherical magnesium oxide to which a lithium compound is added instead of a boron compound so that the content of lithium is 15 to 500 ppm has been proposed (Patent Document 2). Furthermore, to improve smoothness on the surface of particles and obtain moisture resistance, a spherical magnesium oxide containing boron and iron, not lithium, has been proposed (Patent Document 3).

PRIOR ART DOCUMENTS

Patent Document

Patent Document 1: JP 2011-020870 A
Patent Document 2: JP 2016-088838 A
Patent Document 3: JP 2018-131378 A

SUMMARY OF INVENTION

Technical Problem

However, although the spherical magnesium oxide obtained by the method described above has improved moisture resistance and filling properties, flowability of a resin composition at the time of kneading is insufficient when a resin is filled with the spherical magnesium oxide, and thus the moldability of the resin is problematic. Thus, it is an object of the present invention to provide a spherical magnesium oxide with a boron compound added, having high sphericity and high moisture resistance, giving excellent flowability to a resin composition when filled in the resin, and a method for producing the same.

Solution to Problem

To solve the above problem, the present inventors have focused on minor components in spherical magnesium oxide and conducted intensive studies on them, and as a result have found that a spherical magnesium oxide having high sphericity and excellent moisture resistance, giving excellent flowability to a resin composition when filled in a resin can be obtained by including the predetermined amount of boron and adjusting the total content of the two elements of silicon and phosphorus.

Accordingly, the present invention includes a spherical magnesium oxide comprising 10 to 2,000 ppm of boron, and silicon and phosphorus in a total content of 300 to 4,000 ppm, having a volume-based cumulative 50% particle diameter (D50) measured by a laser diffraction/scattering particle size distribution measurement in a range of 3 to 200 µm and a sphericity read from a SEM photomicrograph of 1.00 to 1.10.

The present invention also includes a thermally conductive filler comprising the above spherical magnesium oxide.

The present invention also includes a resin composition comprising the above spherical magnesium oxide.

The present invention also includes a method for producing a spherical magnesium oxide, comprising the steps of:
1) reacting an aqueous magnesium chloride solution with an aqueous alkaline solution to prepare a magnesium hydroxide slurry,
2) drying and then firing the magnesium hydroxide slurry to prepare magnesium oxide particles,
3) forming a dispersion of the magnesium oxide particles and wet-grinding the magnesium oxide particles,
4) spray-drying the wet-ground magnesium oxide and
5) firing the magnesium oxide granulated by the above step, wherein, in at least one of the steps 1) to 4), an amount of boron is adjusted so that a content of boron after the firing is 10 to 2,000 ppm and an amount of silicon and phosphorus is adjusted so that a total content of silicon and phosphorus is 300 to 4,000 ppm after the firing.

Advantageous Effects of Invention

The present invention can provide a spherical magnesium oxide having high sphericity and excellent moisture resistance, giving excellent flowability to a resin composition when filled in a resin, and a method for producing the same.

BRIEF DESCRIPTION OF THE DRAWING

FIG. 1 is a SEM photomicrograph of the spherical magnesium oxide of Example 3.

DESCRIPTION OF EMBODIMENTS

The spherical magnesium oxide of the present invention comprises 10 to 2,000 ppm of boron and silicon and phosphorus in a total content of 300 to 4,000 ppm, and has a volume-based cumulative 50% particle diameter (D50) measured by a laser diffraction/scattering particle size distribution measurement in a range of 3 to 200 μm and a sphericity read from a SEM photomicrograph of 1.00 to 1.10. In the description, ppm means ppm by mass unless otherwise specified.

In the present invention, by including 10 to 2,000 ppm of boron and adjusting the total content of silicon and phosphorus to 300 to 4,000 ppm, a spherical magnesium oxide can be obtained which has a volume-based cumulative 50% particle diameter (D50) measured by a laser diffraction/scattering particle size distribution measurement in a range of 3 to 200 μm and a sphericity read from a SEM photomicrograph of as high as 1.00 to 1.10, and excellent moisture resistance, and which gives excellent flowability to a resin composition when filled in a resin.

In the present invention, a magnesium oxide having a sphericity read from a SEM photomicrograph of as high as 1.00 to 1.10 can be obtained over a range of a relatively large particle diameter in which heat dissipation can be increased, that is, a range of a volume-based cumulative 50% particle diameter (D50) measured by a laser diffraction/scattering particle size distribution measurement from 3 to 200 μm. The volume-based cumulative 50% particle diameter (D50) measured by a laser diffraction/scattering particle size distribution measurement may be preferably 15 to 150 μm, more preferably 25 to 130 μm. As used herein, the sphericity refers to a sphericity read from a SEM photomicrograph, and is 1.00 to 1.10, preferably 1.00 to 1.08, and more preferably 1.00 to 1.06. In the present invention, with respect to 100 particles in an electron photomicrograph taken by using a scanning electron microscope (SEM), lengths of a long diameter and a short diameter passing through the center of each particle are measured, and the ratio of the long diameter/the short diameter is calculated, and the average value is determined as sphericity.

In the present invention, the reason why the magnesium oxide not only has high sphericity but also has excellent moisture resistance and gives excellent flowability to a resin composition when filled in a resin is that the predetermined amount of boron is added thereto and the content of silicon and phosphorus is adjusted to a predetermined range. The content of boron is preferably 10 to 2,000 ppm, preferably 10 to 1,500 ppm, and more preferably 10 to 1,000 ppm. The total content of silicon and phosphorus is in the range of 300 to 4,000 ppm, preferably 350 to 3,500 ppm, and more preferably 400 to 3,000 ppm. When the predetermined amount of boron is added and the total content of silicon and phosphorus is controlled as described above, the sphericity read from a SEM photomicrograph can be adjusted to 1.00 to 1.10, preferably 1.00 to 1.08, and more preferably 1.00 to 1.06, and a weight increase percentage after 168 hours in a moisture resistance test can be suppressed to less than 1% by weight. The flowability of a resin composition when the resin is filled with the magnesium oxide can also be improved by adjusting the total content of silicon and phosphorus in the magnesium oxide to the above range at that stage.

In the present invention, the BET specific surface area, which affects smoothness and hygroscopic properties of particles, may be 0.01 to 1.00 $m^2/g$, preferably 0.02 to 0.80 $m^2/g$, and more preferably 0.02 to 0.50 $m^2/g$.

The method for producing the spherical magnesium oxide of the present invention is not particularly limited, and the spherical magnesium oxide may be produced, for example, as described below.

1) A magnesium hydroxide slurry is prepared by reacting an aqueous magnesium chloride solution with an aqueous alkaline solution, and then
2) the slurry is filtered, washed with water, dried and then fired to prepare magnesium oxide particles,
3) a dispersion of the magnesium oxide particles is prepared, and preferably a dispersion is prepared by adding an organic solvent, and the dispersion is wet-ground, then
4) the dispersion is spray-dried, and
5) the magnesium oxide obtained above is fired to give the intended spherical magnesium oxide. In this method, before the final firing, the content of boron is adjusted by, for example, mixing and/or adding a boron source so that the content of boron in the spherical magnesium oxide is 10 to 2,000 ppm after the final firing. Furthermore, the total content of silicon and phosphorus is adjusted by, for example, mixing and/or adding a silicon source and a phosphorus source so that the total content of silicon and phosphorus in the spherical magnesium oxide is 300 to 4,000 ppm after the final firing.

With respect to the adjustment of the content of boron, specifically, the content of boron in the spherical magnesium oxide finally prepared is adjusted by, for example, a) adding a boron source to a magnesium chloride solution, b) adding a boron source to a magnesium hydroxide slurry prepared, c) mixing a boron source with magnesium oxide particles, or d) adding a boron source to magnesium oxide particles during wet grinding of the magnesium oxide particles. The content of silicon and the content of phosphorus are adjusted by the similar method. The content of boron, the content of silicon and the content of phosphorus may be adjusted in an identical step or in different steps.

The boron source is not particularly limited as long as it is a compound containing boron, and for example, boronic acid, boron oxide, boron hydroxide, born nitride, boron carbide, ammonium borate and the like may be used.

The silicon source is not particularly limited as long as it is a compound containing silicon, and for example, silicon oxide, silicate and the like may be used. Examples of silicon oxides include crystalline silica and amorphous fumed silica. Examples of silicates include sodium silicate, magnesium silicate, calcium silicate and potassium silicate.

The phosphorous source is not particularly limited as long as it is a compound containing phosphorus, and for example, phosphoric acid, phosphate and the like may be used. Examples of phosphate include magnesium phosphate, sodium phosphate, potassium phosphate and ammonium phosphate.

The reason for adjusting the amount of the boron source so that the content of boron in the spherical magnesium oxide after the final firing is 10 to 2,000 ppm and adjusting the amount of the silicon source and the phosphorus source so that the total content of silicon and phosphorus in the spherical magnesium oxide after the final firing is 300 to 4,000 ppm is as described above.

Then, adjusting the total content of phosphorus and silicon in the spherical magnesium oxide after the final firing to a range of 300 to 4,000 ppm can improve flowability of a resin composition when the resin is filled with the magnesium oxide. If the total content of phosphorus and silicon is less than 300 ppm or more than 4,000 ppm, flowability of a resin composition when the resin is filled with the magnesium oxide cannot be improved.

The above aqueous magnesium chloride solution to be used may be, for example, selected from magnesium chloride hexahydrate, magnesium chloride dihydrate, magnesium chloride anhydrate, bittern, lye water, seawater and the like, and a combination thereof.

The above aqueous alkaline solution to be used may be, for example, selected from an aqueous sodium hydroxide solution, an aqueous calcium hydroxide solution, ammonia water and the like, and a combination thereof.

The magnesium hydroxide slurry prepared by reacting an aqueous magnesium chloride solution with an aqueous alkaline solution is filtered, washed with water and dried, and then fired by a method usually used in this technical field to prepare magnesium oxide particles. The resulting magnesium oxide particles are dispersed in a solvent to form a dispersion (e.g., slurry) and this is granulated by wet-grinding and spray-drying. The solvent at that stage is not particularly limited. For example, a known solvent such as an aqueous solvent, a mixed solvent of water and an organic solvent, an alcohol such as methanol or ethanol, a ketone such as acetone, an ester such as ethyl acetate, an ether such as diethyl ether, or an aromatic solvent such as tetrahydrofuran or toluene may be used.

The method of spray drying is not particularly limited, and it is preferable to use, for example, a spray drying method in which the above dispersion of magnesium oxide (e.g., slurry) after wet grinding is sprayed through a rotary disk or a nozzle to prepare magnesium oxide particles. The conditions of operation are accordingly adjusted depending on the viscosity of slurry, the particle size of powder in the slurry, the intended particle diameter and the like. A dispersant may also be added to the slurry. The conditions of operation are not particularly limited, for example, a slurry whose viscosity has been adjusted to 10 to 3,000 cps is sprayed into a stream at 80° C. to 250° C. through a rotary disk or a nozzle while adjusting the flow rate to produce particles having a size of about 1 to 200 μm. It is preferable that the concentration of the dispersion at the time of wet grinding and spraying be adjusted so that the concentration of magnesium oxide is 50 to 70% by weight. The cumulative 50% particle diameter (D50) and the BET specific surface area of the resulting spherical magnesium oxide can be adjusted by appropriately setting the conditions of spraying at that stage. Furthermore, the sphericity of the resulting spherical magnesium oxide can be adjusted by appropriately setting the conditions of spraying.

The conditions of firing of the magnesium oxide granulated is not particularly limited as long as magnesium oxide particles are sintered, and the temperature is set at preferably 1,000° C. to 1,800° C., more preferably 1,100° C. to 1,700° C., and particularly preferably 1,200° C. to 1,600° C. The time of firing, which depends on the temperature of firing, is preferably 0.5 hour to 10 hours. When the temperature of firing is less than 1,000° C., magnesium oxide particles are not sufficiently sintered, and when the temperature of firing is more than 1,800° C., particles are mutually sintered to form a coarse aggregate, and thus the temperature of firing is adjusted to the above range. The BET specific surface area of the resulting spherical magnesium oxide can be adjusted by appropriately setting the conditions of firing at that stage.

While the spherical magnesium oxide of the present invention has sufficient moisture resistance without a surface treatment, such a surface treatment may be performed by using a known method in order to further improve the moisture resistance. The surface treatment agent used for the surface treatment of the spherical magnesium oxide of the present invention is not particularly limited, and for example, a titania sol, a titanate coupling agent, an alumina sol, an aluminate coupling agent and a zirconium coupling agent may be used.

Examples of titanate coupling agents include tetraisopropyl titanate, tetra-n-butyl titanate, tetraoctyl titanate, tetrastearyl titanate and isopropyl triisostearoyl titanate.

Examples of aluminate coupling agents include aluminum isopropylate, mono-sec-butoxy aluminum diisopropylate, aluminum sec-butyrate, aluminum ethylacetoacetate diisopropylate, aluminum tris (ethylacetoacetate) and aluminum alkylacetoacetate diisopropylate.

Examples of zirconium coupling agents include n-propyl zirconate and n-butyl zirconate.

The spherical magnesium oxide of the present invention has high sphericity, excellent moisture resistance, and excellent filling properties to a resin as well as gives excellent flowability to a resin composition when filled in a resin, and therefore it can be suitably added to a resin as a filler and is an excellent thermally conductive filler. Examples of resins which can be used in the present invention include thermosetting resins or thermoplastic resins. Examples of thermosetting resins include, but are not limited to, phenol resin, urea resin, melamine resin, alkyd resin, polyester resin, epoxy resin, diallyl phthalate resin, polyurethane resin and silicone resin. Examples of thermoplastic resins include, but are not limited to, polyethylene resin, polyacrylic resin, ethylene-ethyl acrylate resin, polyamide resin, polyacetal resin, polycarbonate resin, polybutylene terephthalate resin, polysulfone resin, polyamide-imide resin, polyetherimide resin, polyarylate resin, polyphenylene sulfide resin, polyether ether ketone resin, fluorine resin and liquid crystal polymer.

The amount of the spherical magnesium oxide to be added to the resin composition of the present invention may be determined based on properties required for the resin composition and is not particularly limited. In an example, 0.1 to 100 parts by mass of the spherical magnesium oxide may be used based on 100 parts by mass of the resin.

The resin composition comprising the spherical magnesium oxide of the present invention may be used in various fields depending on properties of the resin. Since the spherical magnesium oxide of the present invention has excellent thermal conductivity, the spherical magnesium oxide may be suitably used in applications which require heat dissipation in particular. Furthermore, the resin composition of the present invention may be used as a semiconductor sealing material having excellent thermal conductivity and moisture resistance.

EXAMPLES

The present invention will be described in detail with reference to the following Examples, but these Examples do not limit the present invention in any sense.

<Method of Measurement, Method of Evaluation>

(1) Method of Measuring Content of Boron, Phosphorus and Silicon

The content of boron, phosphorus and silicon was measured by ICP atomic emission spectroscopy. The measurement sample was added to 12N hydrochloric acid (special grade reagent) and the mixture was heated to dissolve the sample completely, and then the content of the respective elements was measured by using an ICP spectrometer (PS3520 VDD made by Hitachi High-Tech Science Corporation).

(2) Method of Measuring BET Specific Surface Area

The BET specific surface area was measured by a gas adsorption method using nitrogen gas (BET method) by using a specific surface area analyzer (Macsorb made by Mountech Co., Ltd.).

(3) Volume-Based Cumulative 50% Particle Diameter (D50)

$0.1 \times 10^{-3}$ kg of the measurement sample was precisely weighed, dissolved in 40 mL methanol and the volume-based cumulative 50% particle diameter (D50) was measured by using a laser diffraction/scattering particle size distribution analyzer (MT3300 made by Nikkiso Co., Ltd.).

(4) Sphericity and Smoothness of Surface Read from a SEM Photomicrograph

A scanning electron microscope (SEM) (JSM6510LA made by JEOL Ltd.) was used. With respect to 100 particles in an electron photomicrograph taken, lengths of a long diameter and a short diameter passing through the center of each particle were measured, and the ratio of the long diameter/the short diameter was calculated, and the average value was determined as sphericity. For the condition of the surface of the spherical magnesium oxide in the electron photomicrograph taken by a scanning electron microscope (SEM), spherical magnesium oxide having a smooth surface with few fine particulates thereon are rated as ○, those having a smooth surface despite the presence of fine particulates thereon or those whose surface is uneven and not smooth with few fine particulates thereon are rated as Δ, and those whose surface is uneven and not smooth with a few fine particulates are rated as x.

(5) Evaluation of Moisture Resistance in Constant Temperature and Humidity Test

The moisture resistance of the spherical magnesium oxide was evaluated by its weight increase percentage in a constant temperature and humidity test. A thermohygrostat, THN040FA made by Advantec Toyo Kaisha, Ltd. was used. A weight increase percentage after exposing 10 g of the spherical magnesium oxide to an environment of 85° C. and 85% RH for 168 hours in the thermohygrostat was measured.

(6) Evaluation of Flowability of Resin by Measurement of Melt Flow Rate

First, a resin composition to be used as a measurement sample was prepared by the following process. 100 g of EEA (ethylene-ethyl acrylate copolymer) (REXPEARL™ EEA A1150 made by Japan Polyethylene Corporation) was melted, and then 333 g of the spherical magnesium oxide was gradually added thereto over about 10 minutes by using a roll kneader while checking the kneaded state, and finish kneading was performed for 10 minutes. The roll gap was 0.5 mm at that stage. After completion of kneading, the compound was pulled therefrom and the compound recovered was cut into about a 5 mm square and dried at 90° C. for 1 hour in a vacuum dryer to give a sample for measuring melt flow rate. The melt flow rate of the measurement sample (resin composition) was measured according to JIS-K7210 at a measurement temperature of 230° C. and a load of 2.16 kg.

(7) Evaluation of Resin Kneading Properties by Measurement of Kneading Torque

A mixture was prepared by adding the spherical magnesium oxide to EEA (ethylene-ethyl acrylate copolymer) (REXPEARL™ EEA A1150 made by Japan Polyethylene Corporation) so that the amount of the spherical magnesium oxide was 45% by weight based on the total amount of the mixture, and it was melted and kneaded using LABO PLASTOMILL (made by Toyo Seiki Seisaku-sho Ltd.) at a rotation speed of 50 rpm at 160° C. The kneading torque which was needed to rotate the stirring blade of the kneader 390 seconds after the start of kneading was measured to evaluate the resin kneading properties. A lower kneading torque can be evaluated to show better resin kneading properties and a better flowability of the resin comprising the spherical magnesium oxide, that is, better moldability and processability.

Example 1

Anhydrous magnesium chloride ($MgCl_2$) was dissolved in ion exchange water to prepare an aqueous magnesium chloride solution having a concentration of about 3.5 mol/L. The $MgCl_2$ solution and a 25% NaOH solution were fed to a reactor, respectively, using a metering pump so that the reaction rate of $MgCl_2$ was 90% by mole to perform continuous reaction. Then boronic acid (made by Kanto Chemical Co., Inc., special grade reagent) was added to the reaction solution so that the content of boron was 400 ppm in the spherical magnesium oxide finally obtained, and silicon dioxide (made by Kanto Chemical Co., Inc., special grade) and magnesium phosphate octahydrate (made by Kanto Chemical Co., Inc., Extra pure) were added thereto so that the content of silicon was 2,200 ppm and the content of phosphorus was 200 ppm (total 2,400 ppm). Then the resultant was filtered, washed with water and dried to give magnesium hydroxide. The resulting magnesium hydroxide was fired at 900° C. for 1 hour to give magnesium oxide particles. An organic solvent was added to the magnesium oxide particles so that the concentration was 60% by weight. Thereafter the magnesium oxide particles were wet-ground by using a ball mill for 4 hours, and then spray-dried by a spray dry method (rotation number 12,000 rpm). The resulting spray-dried magnesium oxide were fired by using an electric oven at 1,600° C. for 1 hour to give the intended spherical magnesium oxide.

Example 2

Spherical magnesium oxide was prepared in the same manner as in Example 1 except for adding silicon dioxide (made by Kanto Chemical Co., Inc., special grade reagent) and magnesium phosphate octahydrate (made by Kanto Chemical Co., Inc., Extra pure) to the reaction solution so that the content of silicon was 900 ppm and the content of phosphorus was 2,200 ppm (total 3,100 ppm).

Example 3

Spherical magnesium oxide was prepared in the same manner as in Example 1 except for adding silicon dioxide (made by Kanto Chemical Co., Inc., special grade reagent) and magnesium phosphate octahydrate (made by Kanto Chemical Co., Inc., Extra pure) to the reaction solution so that the content of silicon was 800 ppm and the content of phosphorus was 200 ppm (total 1,000 ppm) and changing the rotation number in the spray dry method to 6,000 rpm.

Example 4

Spherical magnesium oxide was prepared in the same manner as in Example 1 except for adding silicon dioxide (made by Kanto Chemical Co., Inc., special grade reagent) and magnesium phosphate octahydrate (made by Kanto Chemical Co., Inc., Extra pure) to the reaction solution so that the content of silicon was 2,000 ppm and the content of phosphorus was 200 ppm (total 2,200 ppm) and changing the rotation number in the spray dry method to 6,000 rpm.

Example 5

Spherical magnesium oxide was prepared in the same manner as in Example 1 except for adding silicon dioxide (made by Kanto Chemical Co., Inc., special grade reagent) and magnesium phosphate octahydrate (made by Kanto Chemical Co., Inc., Extra pure) to the reaction solution so that the content of silicon was 800 ppm and the content of phosphorus was 2,100 ppm (total 2,900 ppm) and changing the rotation number in the spray dry method to 6,000 rpm.

Comparative Example 1

Magnesium oxide particles were prepared in the same manner as in Example 1 except for adding silicon dioxide (made by Kanto Chemical Co., Inc., special grade reagent) and magnesium phosphate octahydrate (made by Kanto Chemical Co., Inc., Extra pure) to the reaction solution so that the content of silicon was 4,200 ppm and the content of phosphorus was 200 ppm (total 4,400 ppm)

Comparative Example 2

Magnesium oxide particles were prepared in the same manner as in Example 1 except for adding silicon dioxide (made by Kanto Chemical Co., Inc., special grade reagent) and magnesium phosphate octahydrate (made by Kanto Chemical Co., Inc., Extra pure) to the reaction solution so that the content of silicon was 1,000 ppm and the content of phosphorus was 4,200 ppm (total 5,200 ppm).

Comparative Example 3

Magnesium oxide particles were prepared in the same manner as in Example 1 except for adding silicon dioxide (made by Kanto Chemical Co., Inc., special grade reagent) and magnesium phosphate octahydrate (made by Kanto Chemical Co., Inc., Extra pure) to the reaction solution so that the content of silicon was 3,500 ppm and the content of phosphorus was 4,200 ppm (total 7,700 ppm).

<Results>

For the spherical magnesium oxides of Examples 1 to 5 and Comparative Examples 1 to 3, flowability of resin was evaluated by the above measurement and the measurement of the melt flow rate. The results are shown in the following Table 1.

TABLE 1

| | Example 1 | Example 2 | Example 3 | Example 4 | Example 5 | Comparative Example 1 | Comparative Example 2 | Comparative Example 3 |
|---|---|---|---|---|---|---|---|---|
| Sphericity | 1.02 | 1.05 | 1.02 | 1.01 | 1.05 | 1.16 | 1.15 | 1.18 |
| Condition of surface | ○ | ○ | ○ | ○ | ○ | X | Δ | X |
| Content of silicon (ppm) | 2183 | 940 | 790 | 1932 | 809 | 4243 | 1016 | 3428 |
| Content of phosphorus (ppm) | 211 | 2151 | 180 | 235 | 2154 | 214 | 4219 | 4210 |
| Content of boron (ppm) | 407 | 412 | 410 | 408 | 398 | 397 | 400 | 409 |
| D50 (μm) | 55 | 56 | 135 | 113 | 129 | 50 | 54 | 57 |
| BET specific surface area (m$^2$/g) | 0.1 | 0.09 | 0.03 | 0.03 | 0.03 | 0.17 | 0.13 | 0.18 |
| Moisture resistance (weight increase percentage) | 0.88 | 0.98 | 0.29 | 0.23 | 0.28 | 1.49 | 1.51 | 1.80 |

As is clear from Table 1, the spherical magnesium oxides of Examples 1 to 5 have high sphericity and excellent moisture resistance. Furthermore, the results of evaluation of resin flowability by the measurement of the melt flow rate show that the spherical magnesium oxides of Examples 1 to 3 produced by adjusting the total content of silicon and phosphorus to 300 to 4,000 ppm give higher resin flowability than the magnesium oxides of Comparative Examples 1 to 3 with a total content of silicon and phosphorus more than 4,000 ppm.

Furthermore, the spherical magnesium oxides of Examples 1 to 5 and Comparative Examples 1 to 3 were evaluated for resin kneading properties by measuring the kneading torque. The results are shown in the following Table 2.

TABLE 2

|  | Kneading torque (N · m) |
|---|---|
| Example 1 | 18.7 |
| Comparative Example 1 | 19.2 |

Table 2 shows that while the kneading torque was as low as less than 19.0 N·m when the spherical magnesium oxide of Example 1 was used, the kneading torque was as high as 19.0 N·m or more when the spherical magnesium oxide of Comparative Example 1 was used. In addition to the above, in the case of the spherical magnesium oxides of Examples 2 to 5, the kneading torque was as low as less than 19.0 N·m as in Example 1, and in the case of the spherical magnesium oxides of Comparative Examples 2 and 3, the kneading torque was as high as 19.0 N·m or more as in Comparative Example 1. As described above, the spherical magnesium oxide produced by adjusting the total content of silicon and phosphorus to 300 to 4,000 ppm provides better flowability of resins comprising it than the spherical magnesium oxide with a total content of silicon and phosphorus more than 4,000 ppm.

The above results have revealed that the spherical magnesium oxide of the present invention has high sphericity, excellent moisture resistance, and gives excellent flowability to a resin composition when filled in a resin. Thus, the spherical magnesium oxide of the present invention has been found to be useful as an excellent thermally conductive filler.

INDUSTRIAL APPLICABILITY

The spherical magnesium oxide of the present invention has high sphericity, excellent moisture resistance, and gives excellent flowability to a resin composition when filled in a resin, and thus is useful as an excellent thermally conductive filler.

The invention claimed is:

1. A spherical magnesium oxide comprising 10 to 2,000 ppm of boron, and silicon and phosphorus in a total content of 300 to 4,000 ppm, having a volume-based cumulative 50% particle diameter (D50) measured by a laser diffraction/scattering particle size distribution measurement in a range of 3 to 200 μm and a sphericity read from a SEM photomicrograph of 1.00 to 1.10.

2. The spherical magnesium oxide according to claim 1, wherein the cumulative 50% particle diameter (D50) is 15 to 150 μm.

3. The spherical magnesium oxide according to claim 1, which has a BET specific surface area of 0.01 to 1.00 m$^2$/g.

4. A thermally conductive filler comprising the spherical magnesium oxide according to claim 1.

5. A resin composition comprising the thermally conductive filler according to claim 4.

6. A method for producing a spherical magnesium oxide, comprising the steps of:
    1) Reacting an aqueous magnesium chloride solution with an aqueous alkaline solution to prepare a magnesium hydroxide slurry,
    2) Drying and then firing the magnesium hydroxide slurry to prepare magnesium oxide particles,
    3) Forming a dispersion of the magnesium oxide particles and wet-grinding the magnesium oxide particles,
    4) Spray-drying the wet-ground magnesium oxide, and
    5) firing the magnesium oxide granulated by the above step,
    wherein, in at least one of the steps 1) to 4), an amount of boron is adjusted so that a content of boron after the firing is 10 to 2,000 ppm and an amount of silicon and phosphorus is adjusted so that a total content of silicon and phosphorus is 300 to 4,000 ppm after the firing.

7. The spherical magnesium oxide according to claim 2, which has a BET specific surface area of 0.01 to 1.00 m$^2$/g.

8. A thermally conductive filler comprising the spherical magnesium oxide according to claim 2.

9. A resin composition comprising the thermally conductive filler according to claim 8.

10. A thermally conductive filler comprising the spherical magnesium oxide according to claim 3.

11. A resin composition comprising the thermally conductive filler according to claim 10.

12. A thermally conductive filler comprising the spherical magnesium oxide according to claim 7.

13. A resin composition comprising the thermally conductive filler according to claim 12.

* * * * *